Aug. 10, 1965     E. R. LARSSON     3,199,392
DEVICE FOR CUTTING A CIGAR WRAPPER
Filed Jan. 23, 1963
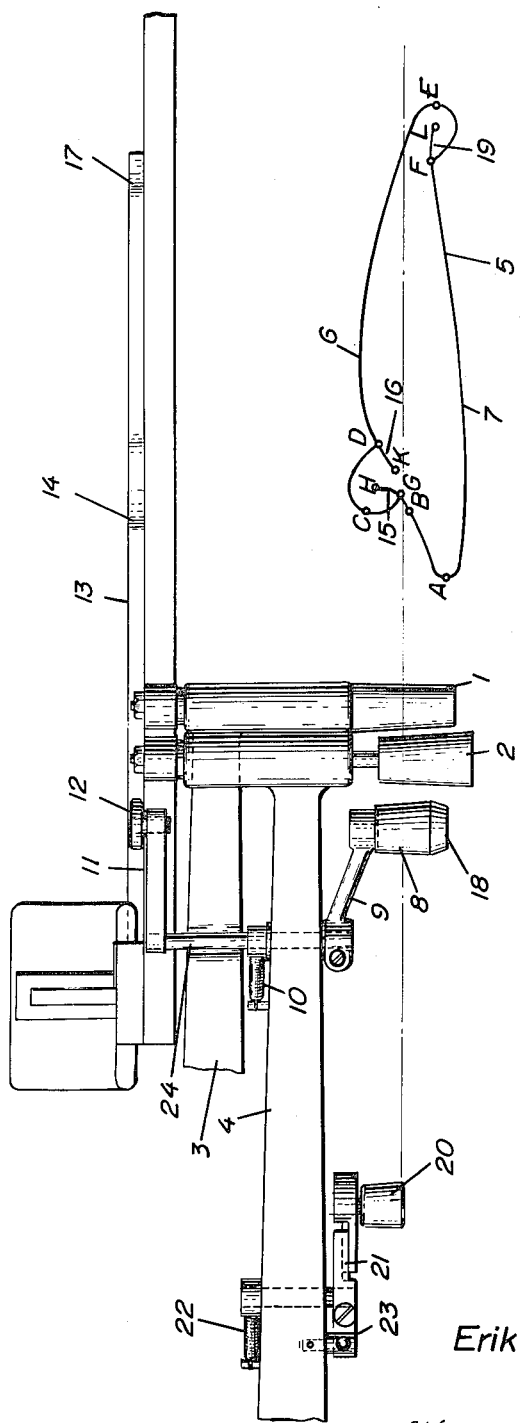
INVENTOR
Erik R. Larsson
BY *Wenderoth, Lind & Ponack*
ATTORNEYS 3,199,392
DEVICE FOR CUTTING A CIGAR WRAPPER
Erik R. Larsson, Vallingby, Sweden, assignor to
Arenco Aktiebolag, Vallingby, Sweden
Filed Jan. 23, 1963, Ser. No. 253,409
Claims priority, application Sweden, Jan. 29, 1962,
926/62
1 Claim. (Cl. 83—512)

The present invention relates to a device for cutting a cigar wrapper by means of a contour knife, a tapered or inclined cutting roller co-operating with each half of the contour knife, and incision knives situated within the contour knife and incision rollers co-operating with these, which rollers are mounted on resilient, pivotable arms which are movable forward and back in a straight path over the knives, the projection of the shaft of a cutting roller on the associated half of the profile knife having more than one intersectional point along a part of the contour knife. In order to make satisfactory cutting possible within such a part of the contour knife, the device according to the invention is provided with two auxiliary cutting rollers intended for cutting within this part, which rollers are mounted on resilient, pivotable arms which are movable forward and back in a straight path and which auxiliary rollers are adapted to cut each a portion of said part, wherewith on movement over parts of the contour knife situated outside one of said portions, with which parts a roller must be prevented from coming into contact, such a roller is maintained in elevated position by a cam influencing its pivotable arm. Herewith each auxiliary roller as well as cutting roller contacts the edge of the contour knife at only one point at the same time, which is a condition for obtaining satisfactory cutting, and simultaneously the auxiliary rollers are prevented from coming into contact with other parts of the wrapper or the knife edge, which would cause damage to them.

The invention is illustrated in the attached drawing which shows in plan view an embodiment of the invention.

The cutting device is provided in normal manner with two tapered cutting rollers 1 and 2 mounted on arms 3 and 4 guided forward and back in a straight path, which arms are pressed downwards by means of springs, not shown. The rollers 1 and 2 are arranged to be moved forward and back over the whole cutting die 5, the cutting roller 1, because of the tapered form, cutting the lengths A–B and C–D–E of the contour knife, while the cutting roller 2 cuts the length A–F–E, i.e. the whole of the other half 7 of the contour knife.

According to the invention there is a further roller 8, mounted on a pivotable arm 9 arranged on the arm 4, which arm 9 is pressed downwards by means of a spring 10 secured to the shaft 24 of the arm 9. The shaft 24 is also connected to an arm 11, at the end of which a cam roller 12 is mounted. The cam roller 12 rolls on a cam 13. The arm 9 is so adjusted that the roller 8 moves the distance A–B above the edge of the contour knife and without coming into contact with it or the tobacco leaf lying on the knife. When the roller 8 reaches the position B the cam roller 12 falls down slightly into a recess 14 in the cam 13 and the roller 8 comes into contact with the edge of the contour knife and cuts the length B–G. When the roller 8 continues its movement it comes into contact with two incision knives 15 and 16 and the incisions G–H and K–D are herewith cut. The roller 8 has here transferred to the function of an incision roller. At the end of the recess 14 the idle cam 12 is elevated, this being adjusted to take place when the roller 8 is at the point D. When the roller 8 continues its movement it is thus again kept raised above the edge of the contour knife 6.

When the roller is at the point F the cam roller 12 is relowered by a recess 17 in the cam 13 and a particular cutting area 18 of the roller 8 comes into contact with a further incision knife 19, and an incision F–L is cut. Simultaneously with this the remaining portion C–G of the contour of the wrapper is cut by a roller 20, mounted on an arm 21 which is pivotally mounted on the arm 4, which arm 21 is pressed downwards by means of a spring 22. The roller 20 is positioned at a suitable height for cutting the portion C–G by an adjustable stop 23, and the roller 20 is so placed that it will be in the position G at the same time that the cutting area 18 of the roller 8 is in the position L, in which position the arms 3 and 4 are stopped and begin the return movement.

The invention is obviously not limited to the embodiment shown, several modifications being possible within the scope of the invention. By using a cam for guiding auxiliary cutting rollers vertically, the cutting of highly complicated wrappers is made possible. If continued movement of the arms 3 and 4 past the above-stated turning position is necessary, the recess 17 in the cam 13 can be made to re-raise the cam roller 12 and therewith the roller 8 at the position L. In such a case the roller 20 must also be arranged to be guided by a cam in a corresponding manner. Moreover, the cutting area 18 can obviously be composed of a separate roller mounted on the same shaft as the roller 8, causing reduced mass in the rollers.

What is claimed is:

Means for cutting a cigar wrapper comprising a contour knife, two cutting rollers each cooperating with a half of said contour knife, the projection of the center axis of at least one of said cutting rollers on the associated half of the contour knife having more than one intersectional point along the contour of said knife, resilient, pivotable arms movable to and fro over said contour knife, auxiliary cutting rollers mounted on said arms to cut the wrapper along portions of the contour of said knife, each of said portions intersecting the projection of the center axis of the corresponding auxiliary roller on the contour knife at only one point, a fixed cam cooperating with said arms to maintain each of said auxiliary rollers at an elevated position upon movement of parts of said contour knife located out of said portions whereby parts of said contour knife are prevented from coming into contact with said auxiliary rollers.

References Cited by the Examiner
UNITED STATES PATENTS

| 688,276 | 12/01 | Williams | 83—511 |
| 2,110,190 | 3/38 | Anderson | 83—512 |
| 2,359,034 | 9/44 | Granstedt | 83—512 |
| 2,846,010 | 8/58 | Wheeler | 83—512 |

FOREIGN PATENTS

| 17,695 | 1889 | Great Britain. |
| 409,510 | 2/45 | Italy. |
| 172,396 | 8/60 | Sweden. |
| 172,550 | 8/60 | Sweden. |

WILLIAM W. DYER, JR., *Primary Examiner.*

ANDREW R. JUHASZ, *Examiner.*